March 29, 1927.

A. L. GRANDSTAFF 1,623,003

STEAM TRAP

Filed June 25, 1925  2 Sheets-Sheet 1

WITNESSES

INVENTOR
A. L. Grandstaff.
BY
ATTORNEYS

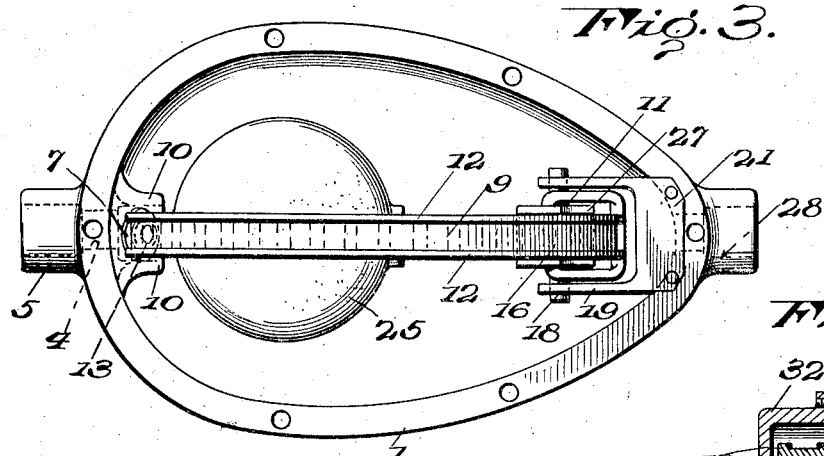

Patented Mar. 29, 1927.

1,623,003

UNITED STATES PATENT OFFICE.

ALBERT L. GRANDSTAFF, OF AKRON, OHIO.

STEAM TRAP.

Application filed June 25, 1925. Serial No. 39,616.

My invention is a trap of the type adapted for use in a steam line to discharge condensate therefrom when the condensate within the trap reaches a certain level or for use in separating fluids of different specific gravities, and it consists in the combinations, constructions and arrangements herein described and claimed.

An object of the invention is the provision of a trap of the character described having a valved outlet adapted when open to permit the passage therethrough of a relatively great volume of fluid in a given time for a trap of a given size.

A further object of the invention is the provision in a trap of the character described of a novel valve seat, valve and valve operating mechanism whereby the valve is adapted to be moved quickly and positively from and to its seat and the trap can be used for a relatively long time without such wear on the contact surfaces of the valve and valve seat as would tend to prevent leakproof contact of the valve with the valve seat when the valve is closed.

A further object of the invention is the provision in a trap of the character described of a valve seat member having a contact face adapted to be ground when required to conform accurately to the contour of the contact face of the associated valve without there being any necessity of removing the valve seat member for grinding or for disassembling the parts of the device.

A still further object of the invention is the provision of a trap of the character described which is simple in construction, comprises only parts which can be quickly and easily assembled, disassembled and repaired, and is thoroughly practical commercially.

Figure 1:
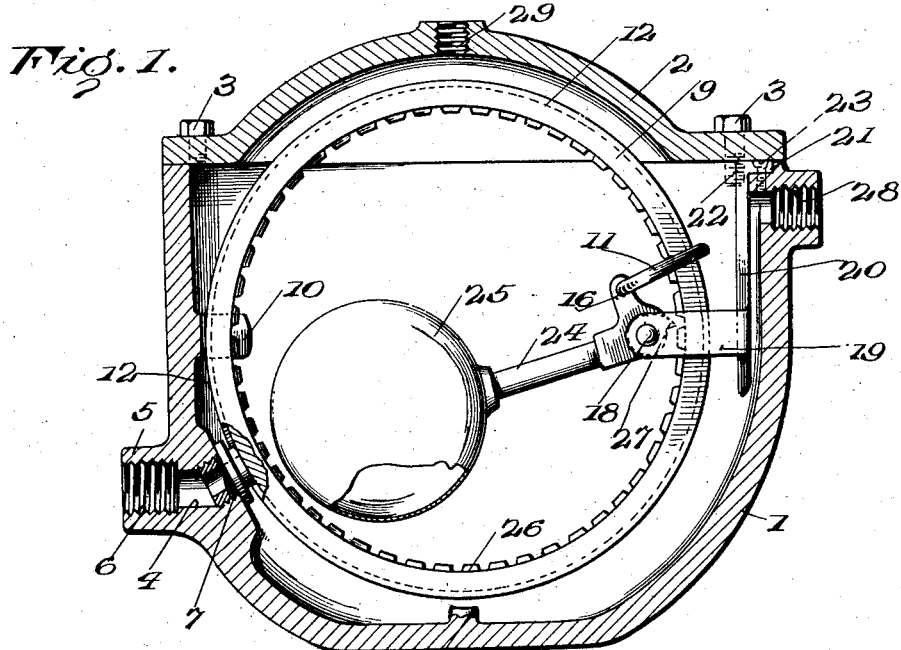
Figure 2:
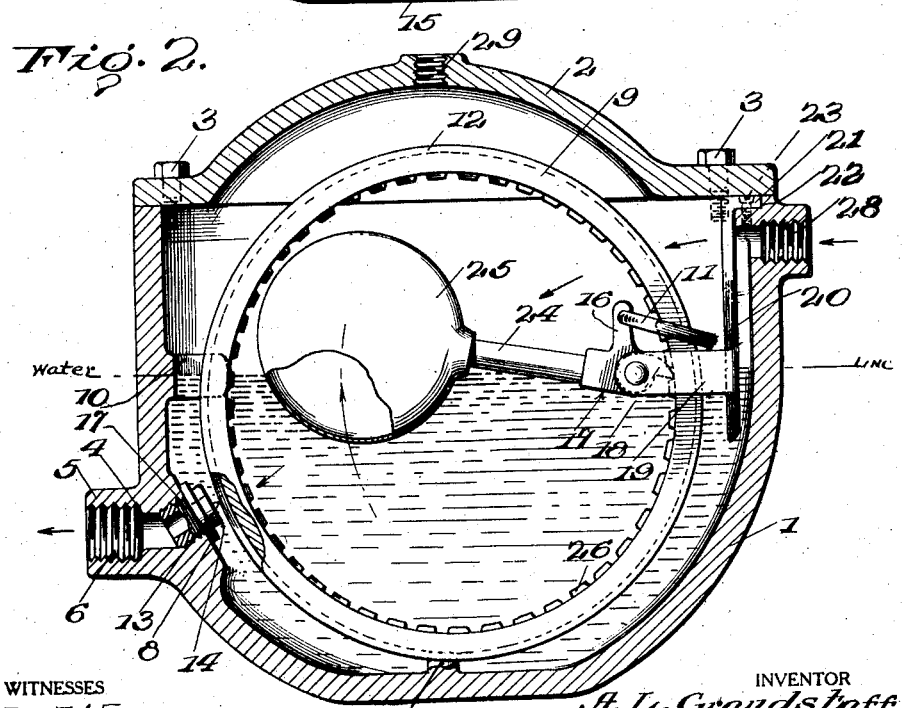

Other objects and advantages of the invention will be apparent from the following description, considered in conjunction with the accompanying drawings, in which:

Figure 1 is a longitudinal vertical section through the improved trap, showing the valve of the trap closed, the valve and the float therefor and the valve seat member of the device being shown mainly in elevation with portions thereof broken away and other portions shown in section, Figure 2 is a view similar to Figure 1, showing the valve in open position, Figure 3 is a plan view of the body of the casing of the device and of the valve and associated parts in the body, the cap of the casing being omitted, Figure 4 is a face view of the body section of the casing of a modified form of trap embodying the invention, showing a valve operating mechanism and associated parts in the body of the casing, Figure 5 is a transverse vertical section through the form of trap shown in Fig. 4, Figure 6 is a longitudinal vertical section through a fragmentary portion of a modified form of ring valve which may be used in either of the two forms of trap which are exhibited in the preceding views, and Figure 7 is a transverse vertical section through the portion of the ring valve shown in Fig. 6.

The form of trap exhibited in Figs. 1 to 3, inclusive, has a substantially oval-shaped casing comprising a body section 1 and a cap section 2 which is adapted to be secured in place on the body section by screws 3 or like fastening devices. The body 1 is formed at one end above the level of the bottom thereof with an outlet opening 4. The outer end portion of the outlet opening 4 may be continuous with the bore of a nipple 5 having screw threads, as at 6, and thus adapted for connection with a drain pipe, not shown, or other tubular conduit. The inner end portion of the outlet opening is screw threaded internally for engagement with the externally screw threaded outer end portion of a tubular valve seat member 7 which may have a flange 8 adjacent to but spaced from its inner end adapted to abut the inner wall of the body 1 surrounding the outlet opening 4 when the tubular valve seat member is in place in the outlet opening 4.

A ring valve 9 is disposed vertically edgewise in the body of the trap casing with the axis of the ring valve extending in a direction at right angles to the direction of the axis of the valve seat member 7.

An appreciable axial movement of the ring 9 in the casing of the trap is prevented by a pair of horizontally spaced guide lugs 10, which extend inwardly from said one end wall of the body 1 of the casing above the level of the outlet opening in straddling relation to a portion of the ring valve, and a loop 11 which encircles a portion of the ring valve and is movably supported adjacent to the opposite end of the body of the casing, both the lugs 10 and the loop 11 being disposed slightly above the level of the axis of the ring valve. The ring valve is shiftable edgewise or in other words in a direction at right angles to its axis between the position shown in Fig. 1 and the position shown in Fig. 2. When the ring valve is in the position shown in Fig. 1, portions of rim flanges 12 on the ring valve at the opposite edges of the outer periphery thereof straddle the extending inner end portion of the valve seat member 7 and the corresponding portion of the outer periphery of the ring valve bears against the inner end wall or contact face 13 of the valve seat member and covers the inner end of the bore of the tubular valve seat member. The contact face 13 of the valve seat member is curved concavely in vertical sectional contour about a radius of the ring valve, so that any portion of the regularly curved peripheral contact face of the ring valve 9 between the rim flanges 12 will seat closely against the contact face of the valve seat member when the ring valve is moved edgewise from the position shown in Fig. 2 against the contact face of the valve seat member. The contact face of the valve seat member preferably is rectangular in outline with the lower corners thereof rounded off at 14 and the bore of the valve seat member preferably is rectangular in cross section.

When the ring valve is in the position shown in Fig. 2, portions of the rim flanges 12 rest on the upper end portion of an upstanding supporting lug or rest 15 which is formed within the body of the case on the bottom of the latter approximately midway between the guide lugs 10 and the loop 11. The upper or supporting face of the lug 15 is curved concavely to conform to the curvature of the outer peripheral wall of the ring valve.

The loop 11 is swingingly supported at its inner end in a horizontal opening in the upstanding arm 16 of a bell crank lever 17 which is fulcrumed on a horizontal pivot element 18. The latter is supported within the ring valve parallel to the axis of the ring valve by a pair of arms 19 of a bracket which includes a vertical attaching arm 20 having an outturned upper end portion 21 secured in a recess 22 in the upper edge portion of the body 1 of the case of the trap by a screw 23. The attaching arm 20 of the bracket depends between the ring valve and the adjacent end wall of the body of the casing while the arms 19 straddle the adjacent portion of the ring valve at a level slightly lower than that of the guide lugs 10. The bell crank 17 also includes a relatively long arm 24 in addition to the arm 16 and this relatively long arm extends within the ring valve and supports a float 25 for movement within the ring valve. An endless series of transverse teeth 26 is formed in the inner periphery of the ring valve and a pusher projection or pawl 27, which is rigid with the bell crank, extends within the ring valve at the opposite side of the axis of the pivot element 18 from the float supporting arm 24 and is adapted to engage with a tooth 26 of the ring valve when the float 25 moves upward from the position shown in Fig. 1 toward the position shown in Fig. 2 and to then shift the ring valve edgewise from position against the valve seat member 7 as shown in Figure 1 to position away from said valve seat member and upon the upstanding rest 15, as shown in Fig. 2, the ring valve being shifted circumferentially by reason of the engagement of the pusher projection 27 with a tooth 26 during the edgewise movement of the ring valve.

The float 25 moves vertically in the body of the casing of the trap with the level of liquid within the casing. This liquid may be condensate which enters the casing with steam through an inlet 28 in the upper part of the body 1 of the casing. The opening 29 is for connection with a pet cock, not shown, to permit escape of any air that may accumulate in the trap.

From the foregoing description of the various parts of the device, the operation thereof may be readily understood. The ring valve is pulled or rolled edgewise from open position on the rest 15 as shown in Fig. 2 to closed position against the valve seat member 7, as shown in Figure 1, by the loop 11, when the bell crank lever is actuated by reason of the float moving downward from the position shown in Fig. 2 to the position shown in Fig. 1. Since the ring valve shifts circumferentially or about its axis each time it is moved edgewise, it is obvious that a different portion of the outer periphery of the ring valve will contact with the contact face of the valve seat member each time the ring valve is moved to closed position until the ring valve has been shifted about its axis through 360°. The wear on the contact surface of the ring valve therefore will be uniformly distributed and will be relatively slight on any one portion of the contact surface of the ring valve when the device has been used in the service for which it is intended for a given time. The device therefore will be unimpaired after service for a relatively long time. The loop 11 contacts with the rim flanges of the ring valve and therefore does not cause any wear on the portion of the peripheral surface of the valve ring which contacts with the valve seat member. These rim flanges on the ring valve also otherwise protect the contact or seating face of the ring valve. Regrinding of the contact face of the valve seat member can be accomplished by supporting the float so that the ring valve can be turned in contact with the contact face of the valve seat member and then applying grinding compound to the contact face of the ring valve and turning the latter by hand in contact with the contact face of the valve seat member.

The rounded lower corners of the inner end of the valve seat member serve as a fulcrum on which the ring valve rolls from the position shown in Fig. 1 to the position shown in Fig. 2 without appreciable wear on the contact face of the ring valve.

The ring valve is adapted to be actuated by a relatively small float and the motion transmitting mechanism which has been described to cover a liquid discharge orifice or outlet of relatively great area and therefore the improved trap is adapted to discharge a relatively great volume of liquid in a given time for a trap of a given size. The ring valve will be quickly moved to and from its seat, thus precluding "wire drawing" between the valve and its seat, either when the valve is opening or closing.

The form of the trap shown in Figures 4 and 5 has a casing comprising a body section 31 having an enlarged rim portion 32 in which the ring valve 9 is movable edgewise to and from position to engage with the contact face of the valve seat member 7 which is secured in place in an outlet opening 33 in the rim portion of the body section 31 above the level of the lowest part of the space within the latter. A substantially crescent shaped baffle or deflector member 34 extends between the side walls of the case and within the ring valve 9, the arcuately curved portion of the baffle being proximate to the ring valve and to the rim portion of the body section 31 and cooperating with the latter to define a relatively narrow passage at 35 within the body 31 from the upper part of the latter to and below the level of the bore of the valve seat member 7 in the outlet opening 33. A float 36 is disposed within the ring valve 9 and is supported on a relatively short arm 37 of a bell crank lever having an upstanding arm 38 formed at its extremity to engage with the teeth 26 in the inner wall of the ring valve 9. The lever 37—38 is fulcrumed on the cross bar at the inner end of a loop 39 which passes around the ring valve and is inclined downward toward its outer end. An arm 40 depends from the juncture of the arms 37 and 38 and may engage with the inner face of the ring valve to limit the swinging movement of the float 36 toward the adjacent portion of the ring valve. The casing of the modified form of the device includes also a side cover or cap section 41 which is secured to the body section by screws 42. The hereinbefore mentioned baffle 34 comprises a section integral with the body 31 of the case and a cooperating section integral with the cap section 41 of the case, as shown in Fig. 5. When the ring valve is moved away from its seat, the suction on the passage 35 at the time discharge of liquid takes place will cause discharge from the casing of air which has accumulated in the upper part of the casing and the form of the device shown in Fig. 5 therefore is well adapted for draining heating systems, radiators and low pressure lines. Let it be assumed that the modified form of the device is connected to a steam line, not shown, for draining condensate as formed and for discharging it to the atmosphere or any other place at which there exists a pressure less than the pressure of the line. The ring valve 9 normally would rest on the bottom of the rim 32. The trap is installed so that the inlet and outlet connections thereof will be level and the casing therefore will contain water up to the level of the orifice 33. The member 38 does not engage any of the teeth 26 when the trap is devoid of water and the ring valve rests on the bottom of the rim 32. The float 36 is raised as the height of the water level in the trap increases as water enters the trap through the inlet of the trap until the member 38 engages with one of the teeth 36. This causes an upward unbalanced force on the right hand side of the ring valve 9 so that the ring valve is moved onto the valve seat member 7 in position to cover the orifice 33. Water accumulating thereafter within the trap will lift the float 36 still further upwardly and will cause the ring valve to move upwardly from the orifice 33 so that the orifice 33 will be open to a slight extent. The float and the ring valve thereafter will oscillate through a limited range back and forth, the ring valve oscillating between open and closed positions and being moved upwardly when the float moves upwardly because of the engagement of the member 38 with said tooth 26.

The modified form of ring valve partially shown in Figs. 6 and 7 has an annular body 9ª formed with transverse teeth 26ª in its inner wall and with outwardly extending flanges 12ª at the edges of its outer wall. Slots 50 are formed in the inner faces of the flanges 12ª at the juncture of the latter with the body 9ª of the ring valve. A facing strip 51 can be projected endwise with the side edge portions thereof in engagement with tangential slots 52 to position flatwise against the outer wall of the body 9ª with the edge portions of the facing strip received in the slots 50.

I claim:

1. In a device of the character described, a casing having an outlet opening, a valve seat member extending inwardly within the casing from said outlet opening, a ring valve within the casing and having a peripheral surface adapted to cooperate with said valve seat member to close said outlet, and means responsive to the rise and fall of liquid within the casing for shifting said ring valve edgewise against and away from said valve seat.

2. In a trap, a casing having an outlet for liquid, means providing a valve seat at the inner end of the outlet, a ring valve in the casing, the peripheral surface of the ring valve being adapted when in contact with the valve seat to cover said outlet, and float controlled means within said casing for shifting said ring valve to and from position to engage with said valve seat.

3. In a trap, a casing having an outlet for liquid, means providing a valve seat at the inner end of the outlet, a ring valve in the casing, the peripheral surface of the ring valve being adapted when in contact with the valve seat to cover said outlet, and float controlled means within said casing for shifting said ring valve to and from position to engage with said valve seat and for simultaneously shifting said ring valve about its axis.

4. In a trap, a casing having an outlet for liquid, means providing a valve seat at the inner end of the outlet, a ring valve in the casing, the peripheral surface of the ring valve being adapted when in contact with the valve seat to cover said outlet, float controlled means within said casing for shifting said ring valve to and from position to engage with said valve seat and guide means within the casing preventing appreciable axial movement of said ring valve.

5. In a trap, a casing having an outlet for liquid, means providing a valve seat at the inner end of the outlet, a ring valve in the casing, the peripheral surface of the ring valve being adapted when in contact with the valve seat to cover said outlet, and float controlled means within said casing for shifting said ring valve to and from position to engage with said valve seat, said valve seat being curved to lie in an arc of a circle struck by a radius coincident in length with a radius of the ring valve.

6. In a trap, a casing having an outlet for liquid, means providing a valve seat at the inner end of the outlet, a ring valve in the casing, the peripheral surface of the ring valve being adapted when in contact with the valve seat to cover said outlet, and float controlled means within said casing for shifting said ring valve to and from position to engage with said valve seat, said valve seat being curved to lie in an arc of a circle struck by a radius coincident in length with a radius of the ring valve, said ring valve having outwardly extending flanges at the edges of its periphery adapted to straddle said periphery when said ring valve is in contact with said valve seat.

7. In a trap, a casing having an outlet for liquid, means providing a valve seat at the inner end of the outlet, a ring valve in the casing, the peripheral surface of the ring valve being adapted when in contact with the valve seat to cover said outlet, a float within the ring valve, a lever fulcrumed within the ring valve and attached to said float, a pull loop carried by said lever and encircling a portion of said ring valve in position to pull said ring valve edgewise onto said valve seat when said float moves downward in the casing below a definite level, cooperative means carried by said lever and said ring valve for causing said ring valve to be pushed from said valve seat when said float moves upward in the casing above said definite level.

8. In a trap, a casing having an outlet for liquid, means providing a valve seat at the inner end of the outlet, a ring valve in the casing, the peripheral surface of the ring valve being adapted when in contact with the valve seat to cover said outlet, a float within the ring valve, a bell crank lever fulcrumed within the ring valve adjacent to the inner wall of the ring valve, a float carried at the end of the inner arm of said bell crank, the other arm of said bell crank being upstanding, a loop carried by the last named arm of the bell crank encircling the adjacent portion of the ring valve, said ring valve having an endless series of transverse teeth in its inner wall, and a pusher projection carried by said lever in position to engage teeth of said ring valve when said float moves upward from a definite level to push said ring valve from said valve seat and to rotate said ring valve, said loop being adapted to pull said ring valve onto said valve seat when said float moves downward below said definite level.

9. In a trap, a casing having an outlet for liquid, means providing a valve seat at the inner end of the outlet, a ring valve in the casing, the peripheral surface of the ring valve being adapted when in contact with the valve seat to cover said outlet, float controlled means within said casing for shifting said ring valve to and from position to engage with said valve seat, and an upstanding projection on the bottom of said casing on which said ring valve rests when the ring valve has been moved edgewise from position against said valve seat.

10. In a device of the character described, a ring valve having outwardly extending flanges at the edges of its outer periphery, said flanges having alined slots in the inner walls of said flanges at the juncture of said flanges and the body of the ring valve and tangential entering slots extending from said first named slots to the outer edges of the flanges, and a facing strip adapted to be moved endwise with the side edge portions thereof in said tangential slots to position to be disposed entirely on the periphery of the body of the ring valve with the side edge portions of the strap received in said first named slots.

ALBERT L. GRANDSTAFF.